United States Patent [19]

Reuterskiöld

[11] 4,211,308

[45] Jul. 8, 1980

[54] DEVICE FOR ABSORBING TENSION LOADS IN AN ELONGATE FLEXIBLE MEMBER

[76] Inventor: Tom C. Reuterskiöld, stra Kyrkogatar 51, S-593 00 Västervik, Sweden

[21] Appl. No.: 958,740

[22] Filed: Nov. 8, 1978

[51] Int. Cl.² ............................................... F16F 7/12
[52] U.S. Cl. ..................................... 188/1 C; 277/229
[58] Field of Search .......................... 188/1 B, 1 C; 138/118.1, 125; 174/68 C; 267/158; 277/227, 229; 333/95 A

[56] References Cited

U.S. PATENT DOCUMENTS

| 723,831 | 3/1903 | Cole | 277/229 X |
|---|---|---|---|
| 2,161,820 | 6/1939 | Kessenich | 188/1 C X |
| 3,460,578 | 8/1969 | Schmid | 138/125 |
| 4,115,609 | 9/1978 | Denman | 277/229 X |

FOREIGN PATENT DOCUMENTS 396988 4/1977 Sweden .

*Primary Examiner*—Duane A. Reger
*Attorney, Agent, or Firm*—Ostrolenk, Faber, Gerb & Soffen

[57] ABSTRACT

A device is provided for absorbing tension loads in a flexible member. The device is shaped as a bent tube for mounting on the flexible member. The free ends of the tube are so oriented that at each free end a tangent to the curved central axis of the tube forms, in a non-loaded condition for the tube, an acute angle with a line through the centers of the tube ends. The device resists straightening of the flexible member when loading the flexible member.

7 Claims, 3 Drawing Figures

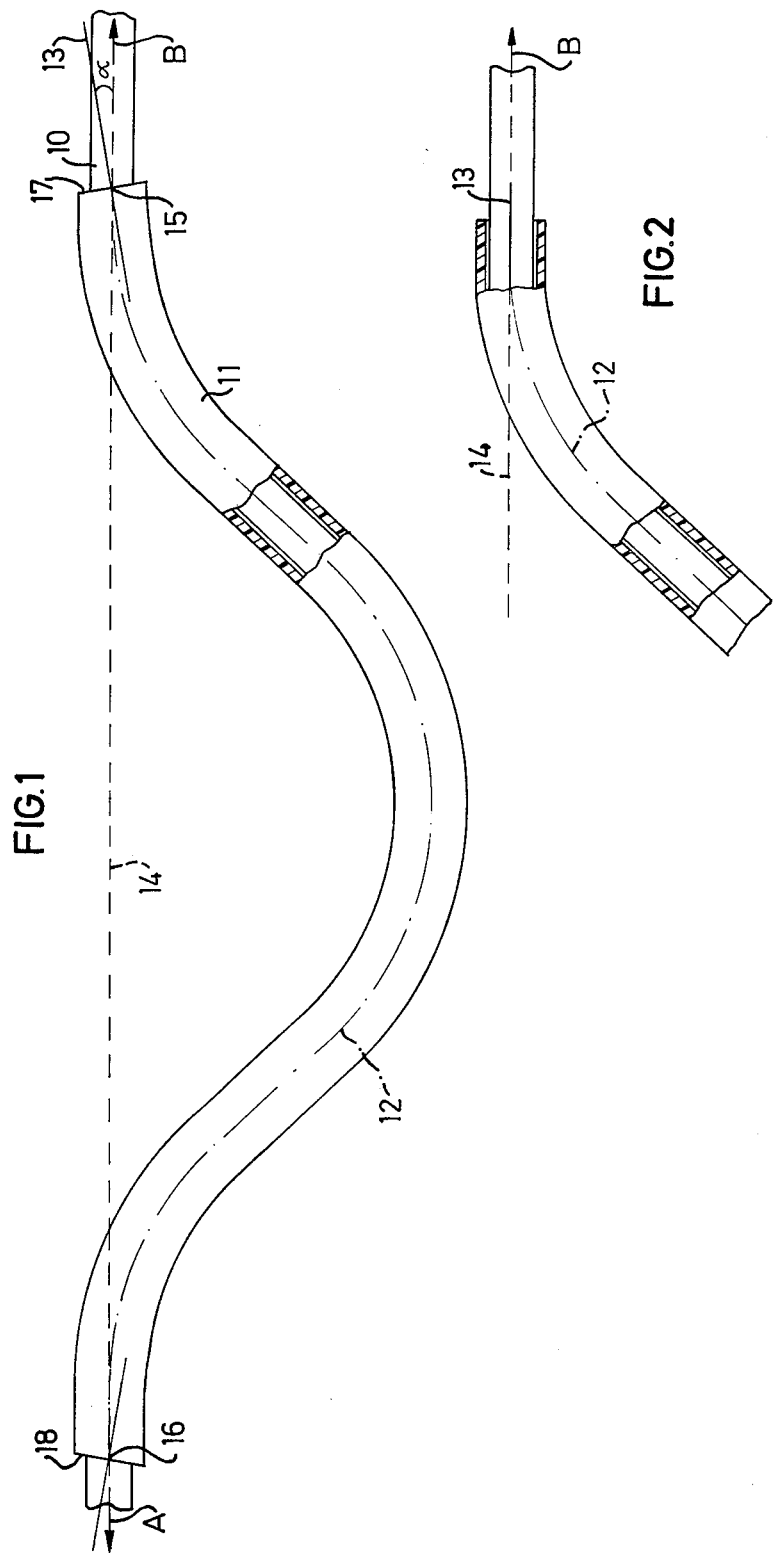

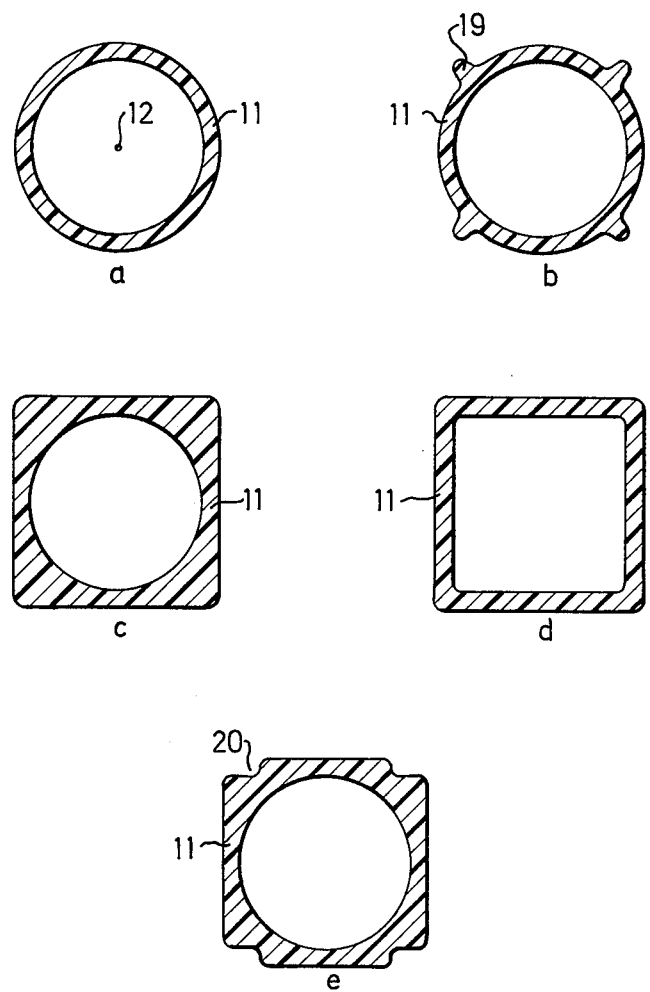

DEVICE FOR ABSORBING TENSION LOADS IN AN ELONGATE FLEXIBLE MEMBER

This invention relates to improvements in a device for absorbing tension loads in an elongate flexible member.

It is known to run a flexible member through a bent tube and to use said tube for absorbing tension loads applied to the flexible member. The tube used is deformable and resists straightening of the flexible member when tension load is applied to said member (Swedish Pat. No. 396,988).

One object of the invention is to provide for a device of the above character an improved interaction between the device and the flexible member for which it is intended.

A further object is to provide a device which can readily be manufactured at a low cost.

Other objects and advantages of the invention will appear from the following description of exemplary forms of the invention shown in the drawing, in which:

FIG. 1 shows a side view, partly in section, of a device according to the invention in a non-loaded condition;

FIG. 2 shows a portion of the device shown in FIG. 1, but in a loaded condition; and FIG. 3 shows alternative cross-sections of the device.

In FIG. 1 an elongate flexible member 10 such as, for instance, a wire, rope, band, chain or other member, is run through a device according to the invention. The device 11 generally has the shape of a bent tube, which has an inner diameter wide enough to accommodate the flexible member 10 and to allow said member to be run through the device 11. The flexible member 10 is intended to be tensionally loaded as indicated by arrows A and B, representing opposing forces. Specifically, the device is intended for mooring boats, where there is a need to absorb transient tension loads in a flexible member holding the boat secured to a mooring place. Of course, many other applications are also possible.

The device 11 has a curved central axis 12, as indicated in FIG. 1. At each of the two opposing free ends of the device 11 a tangent 13 to the curved central axis 12 forms, when the device 11 is in a non-loaded condition as indicated in FIG. 1. an angle $\alpha$ with a straight line 14 through the centers 15 and 16 of the two ends 17 and 18. The angle $\alpha$ is acute and is preferably in the region 5°–20°. When increasing the tensional load applied to the flexible member 10, the device 11 gradually becomes more straightened so that the angle $\alpha$ gradually decreases and finally becomes essentially zero at a fully loaded condition, as indicated in FIG. 2.

The device 11 is made of a suitable elastic material such as plastics, metal or other material. It is also possible to combine two or more materials in order to obtain desirable qualities. Depending on the material or combination of materials selected, the device 11 is given such shape and such dimensions that a proper deformation resulting in a shape basically as indicated in FIG. 2 is obtained at a specified full tensional load in the flexible member 10.

A device according to the invention will, because of its shape, be exposed to better distributed loads from the flexible member than a device having an original shape as shown in FIG. 2. In order to further improve the load transfer, the device 11 can have rounded or flared inner edges at its free ends.

The cross-sectional shape of the device 11 can be varied in a great number of ways, depending on the selected material, the kind of flexible member, the stiffness requirements, etc. Some possible cross-sectional shapes are indicated in FIG. 3. FIG. 3a shows a circular tube, whereas in FIG. 3b a circular tube is provided with a number of lengthwise stiffening beads 19. FIGS. 3c and 3d both show square profiles, the only difference being the shape of the hollow interior. FIG. 3e is similar to FIG. 3c, but for reasons of appearance there is provided a lengthwise groove 20 at each exterior corner.

A device 11 according to the invention is easy to use with a variety of flexible members. There is no need for a connecting arrangement between the device and the flexible member. A failure of the device does not eliminate the capability of the flexible member to take loads, and hence good security is obtained.

What I claim is:

1. A device for absorbing tension loads in an elongate flexible member, said device comprising a bent tube having a curved central axis, said tube having free end portions which are generally directed away from each other, said tube having an inner diameter wide enough to allow a flexible member to be run through said tube, said tube being elastically deformable so as to resist straightening of a tensioned flexible member inserted through said tube, said tube having a shape such that at each said free end, a tangent to the curved central axis of said tube forms, in a non-loaded condition for said tube, an acute angle with a straight line through the centers of said tube free ends, said tube having such an elasticity that, for an increasing tensional load on a flexible member inserted through said tube, said acute angle is gradually reduced so as to become essentially zero at a fully loaded condition of that flexible member.

2. A device according to claim 1, wherein acute angle for the non-loaded condition is in the range 5°–20°.

3. A device according to either of claims 1 or 2, wherein said tube has a single plane of curvature.

4. A device according to either of claims 1 or 2, wherein said tube is made of a plastics material.

5. A device according to claim 3, wherein said tube has essentially a square cross-section, and has side walls which are parallel to the plane of curvature.

6. A device according to claim 1, wherein said tube has a central portion joining said two end portions, said central portion being generally U-shaped, and said end portions curving away from each other so that said free ends of said end portions are more remote from each other than are those ends of said end portions adjoining said central portion.

7. In combination, an elongate flexible member, and a device for absorbing tension loads in an elongate flexible member according to any of claims 1, 2 or 6, said flexible member being run through said tube and being of such a length and being so positioned in said tube as to extend out of said free ends of said tube.

* * * * *